(12) United States Patent
Kim

(10) Patent No.: US 7,480,008 B2
(45) Date of Patent: Jan. 20, 2009

(54) VIDEO APPARATUS AND METHOD FOR CONTROLLING THE SAME

(75) Inventor: Min Kyung Kim, Gyeongsangbuk-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 11/185,891

(22) Filed: Jul. 21, 2005

(65) Prior Publication Data

US 2006/0017846 A1    Jan. 26, 2006

(30) Foreign Application Priority Data

Jul. 23, 2004    (KR) .................... 10-2004-0057673

(51) Int. Cl.
*H04N 9/475* (2006.01)
(52) U.S. Cl. ..................... 348/515; 348/518
(58) Field of Classification Search ................ 348/500, 348/501, 512, 513, 514, 515, 516, 517, 518, 348/519, 521, 522
See application file for complete search history.

(56) References Cited

U.S. PATENT DOCUMENTS

| | | | | |
|---|---|---|---|---|
| 4,703,355 A * | 10/1987 | Cooper | ...... | 348/512 |
| 5,202,761 A * | 4/1993 | Cooper | ...... | 348/515 |
| 5,351,090 A * | 9/1994 | Nakamura | ...... | 348/484 |
| 5,570,372 A * | 10/1996 | Shaffer | ...... | 370/468 |
| 5,751,368 A * | 5/1998 | Cooper | ...... | 348/512 |
| 5,966,385 A * | 10/1999 | Fujii et al. | ...... | 370/465 |
| 6,285,405 B1 * | 9/2001 | Binford et al. | ...... | 348/512 |
| 6,630,963 B1 * | 10/2003 | Billmaier | ...... | 348/485 |
| 6,862,044 B2 * | 3/2005 | Kariatsumari | ...... | 348/515 |
| 7,136,399 B2 * | 11/2006 | Lanigan et al. | ...... | 370/517 |
| 2003/0128294 A1 * | 7/2003 | Lundblad et al. | ...... | 348/515 |
| 2003/0142232 A1 * | 7/2003 | Albean | ...... | 348/512 |
| 2003/0193616 A1 * | 10/2003 | Baker et al. | ...... | 348/515 |

FOREIGN PATENT DOCUMENTS

| | | |
|---|---|---|
| CN | 1377185 | 10/2002 |
| CN | 1452394 A | 10/2003 |
| EP | 1067773 | 1/2001 |
| EP | 1 104 179 | 5/2001 |
| EP | 1 357 759 | 10/2003 |
| GB | 2 273 215 | 6/1994 |
| JP | 08-212701 | 8/1996 |
| JP | 09-205625 | * 8/1997 |
| JP | 09205625 | 8/1997 |

(Continued)

OTHER PUBLICATIONS

Korean Office Action dated Mar. 20, 2006.

(Continued)

*Primary Examiner*—Ngoc-Yen T Vu
*Assistant Examiner*—Albert H Cutler
(74) *Attorney, Agent, or Firm*—KED & Associates, LLP

(57) ABSTRACT

Disclosed herein are a video apparatus and a method for controlling the same, wherein a video signal and an audio signal are synchronized. The method comprises receiving a video signal and an audio signal, detecting an internal delay time and/or external delay time associated with the video signal, and delaying the audio signal on the basis of the detected internal delay time and/or external delay time to synchronize the video signal and the audio signal with each other.

35 Claims, 4 Drawing Sheets

FOREIGN PATENT DOCUMENTS

| | | |
|---|---|---|
| JP | 2001-101803 | 4/2001 |
| JP | 2003-046901 | 2/2003 |
| KR | 1998-040704 | 8/1998 |
| KR | 10-2003-0065336 A | 8/2003 |
| WO | WO 01/51340 | 7/2001 |
| WO | WO 03/039142 A1 | 5/2003 |

OTHER PUBLICATIONS

European Search Report dated Nov. 27, 2007.
Database WPI Week 199741, Derwent Publications Ltd., London, GB; AN1997-446594 XP002331085 -&JP 09 205625, Aug. 5, 1997.

* cited by examiner

VIDEO APPARATUS AND METHOD FOR CONTROLLING THE SAME

This application claims the benefit of Korean Patent Application No. 10-2004-0057673, filed on Jul. 23, 2004, which is hereby incorporated by reference as if fully set forth herein.

BACKGROUND OF THE INVENTION

1. Field of the Invention

The present invention relates to a video apparatus, and more particularly, to a video apparatus and a method for controlling the same, wherein a video signal and an audio signal are synchronized.

2. Discussion of the Related Art

FIG. 1 is a block diagram showing the configuration of a conventional video apparatus, and FIG. 2 is a flow chart illustrating a video/audio processing method of the conventional video apparatus. A tuner 1 tunes a broadcast signal of a channel desired by the user (S11). The tuned broadcast signal is separated into a video signal, an audio signal, and supplementary information (S12). A video/audio processor 2 receives the separated video and audio signals and transforms the received video signal into video data that can be displayed through a display unit 3 and the received audio signal into audio data that can be outputted through a speaker 5, respectively (S13). A controller 7 stores the supplementary information in a memory 6 and outputs control signals to control the respective components of the video apparatus.

In this video apparatus, it is necessary to synchronize a video signal and audio signal inputted to the video apparatus with each other to remove a time difference between the video signal and the audio signal in the process of outputting the video signal and audio signal through the corresponding signal processings. The time difference between the video signal and the audio signal results from the fact that the processing of the video signal is more complicated than that of the audio signal and is performed for a longer period of time than that of the audio signal.

For an analog television (TV) which is a representative example of the video apparatus, the volume of the video signal is not larger than that of a digital TV and the delay thereof is thus not so severe as to disturb the viewer's TV watching. However, for the digital TV, a large amount of video data must be processed, and the video data is subjected to very complex signal processings, such as decoding, deinterlacing, scaling, etc., after being received over a specific channel. As a result, the delay of the video signal is considerably severe.

In particular, for digital broadcasting of a satellite broadcasting type, a TV must receive a digital broadcast signal through a satellite antenna and set-top box (STB). At this time, the video signal delay of the STB itself is added to the internal video signal delay of the TV, resulting in a larger time difference between picture and sound. In this case, it is very inconvenient for the viewer to watch the TV.

SUMMARY OF THE INVENTION

Accordingly, the present invention is directed to a video apparatus and a method for controlling the same that substantially obviate one or more problems due to limitations and disadvantages of the related art.

An object of the present invention is to provide a video apparatus and a method for controlling the same, wherein a video signal and an audio signal are synchronized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video apparatus comprises a video/audio processor for transforming a received video signal into a signal that can be displayed and a received audio signal into a signal that can be outputted, respectively; a controller for detecting an internal delay time and/or external delay time associated with the video signal and determining a delay time of the audio signal on the basis of the detected internal delay time and/or external delay time; and a delay for delaying the audio signal according to the delay time determined by the controller.

In another aspect of the present invention, a method for controlling a video apparatus comprises the steps of receiving a video signal and an audio signal; detecting an internal delay time and/or external delay time associated with the video signal; and delaying the audio signal on the basis of the detected internal delay time and/or external delay time to synchronize the video signal and the audio signal with each other.

Preferably, the step of detecting the internal delay time includes the step of reading the internal delay time from a memory.

Alternatively, the step of detecting the internal delay time may include the step of detecting the internal delay time on the basis of a time difference between a test signal sent to each internal device of the video apparatus and a signal fed back in response to the test signal.

Preferably, the step of detecting the external delay time includes the steps of receiving information regarding an external device which provides the video signal and audio signal to the video apparatus; and reading the external delay time from a memory on the basis of the received external device information.

Alternatively, the step of detecting the external delay time may include the steps of identifying a video source which provides the video signal and audio signal to the video apparatus; and reading an external delay time corresponding to the video source from a memory.

Preferably, the control method further comprises the step of determining, on the basis of the detected internal delay time and external delay time, whether the received video signal is delayed internal or external to the video apparatus.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
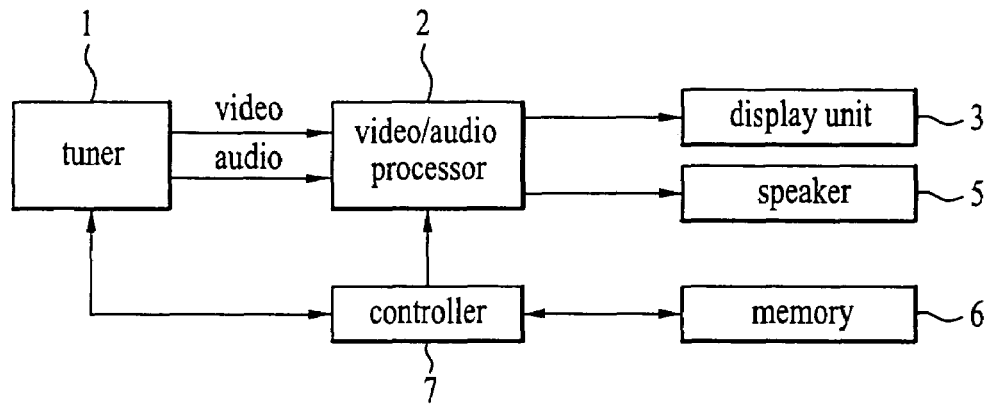
FIG. 1 is a block diagram showing the configuration of a conventional video apparatus.
Figure 2:
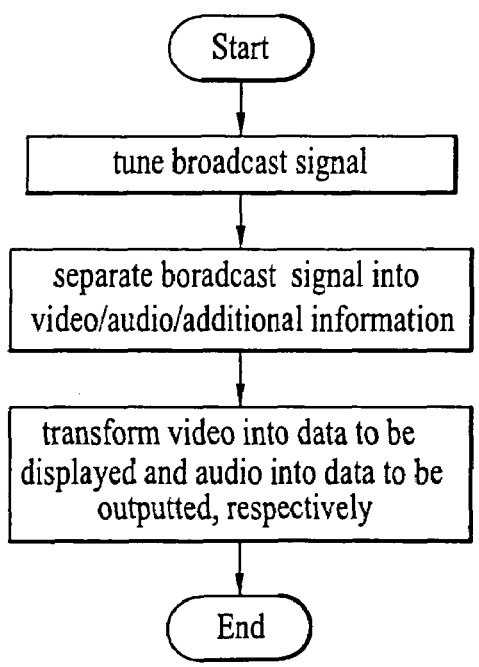
FIG. 2 is a flow chart illustrating a method for controlling the conventional video apparatus.
Figure 3:
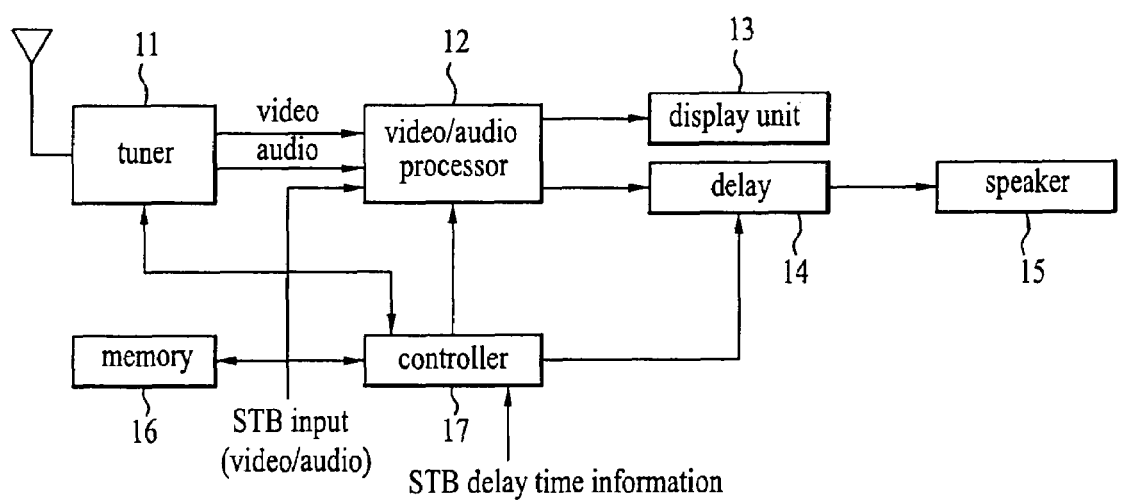
FIG. 3 is a block diagram showing the configuration of a video apparatus according to the present invention.

FIG. 3 is a block diagram showing the configuration of a video apparatus according to the present invention. As shown in this drawing, the video apparatus according to the present invention comprises a tuner 11 for receiving a broadcast signal of a selected channel, a demultiplexer (not shown) for separating the received broadcast signal into a video signal, an audio signal and supplementary information, and a video/audio processor 12 for processing the video signal and audio signal sent from the demultiplexer or a video signal and audio signal sent from an external device so that they can be outputted through a display unit 13 and speaker 15, respectively. The video apparatus further comprises a delay 14 for delaying the audio signal outputted from the video/audio processor 12 by a predetermined time and outputting the delayed audio signal to the speaker 15, a memory 16 for storing various operating programs, temporary information for the operation of the video apparatus, and internal delay time information of the video apparatus, and a controller 17 for determining a delay time of the delay 14 according to the internal delay time information and external delay time information inputted from an external device.

The video/audio processor 12 includes a decoder, deinterlacer, scaler IC, etc. to process the video signal.

The internal delay time information stored in the memory 16 includes respective video processing times of video processing associated devices of the video apparatus, and the total of the video processing times. The internal delay time information can be stored by a manufacturer in a manufacturing process of the video apparatus, because the video processing time of the video apparatus can be obtained through testing. The internal delay time information may include data processing times of the internal devices of the video apparatus detected by the controller 17.

The delay 14 includes a device for adjusting the delay time under control of the user or the controller 17. For example, the delay 14 includes at least one of a flip-flop, latch and shift register.

The controller 17 receives the external delay time information from the external device, for example, an STB for satellite broadcasting reception, through a spare terminal, usually not used, or a separate additional terminal. Since the STB is also a video processing device, the video processing time of the STB itself can be obtained in a similar manner to the above. The STB sends the delay time information thereof to the video apparatus connected therewith automatically or in response to the video apparatus's request in consideration of compatibility with the video apparatus. That is, an STB operating program is implemented in the STB such that the STB sends the delay time information simultaneously with the video and audio signals when sending the video and audio signals to the video apparatus. Further, the STB sends the delay time information to the video apparatus according to a standard communication protocol (for example, Bluetooth, RS-232C, IIC, IEEE1394, USB, or the like) supportable by the video apparatus.

Preferred embodiments of a method for controlling the video apparatus according to the present invention will hereinafter be described.

First Embodiment

Figure 4:
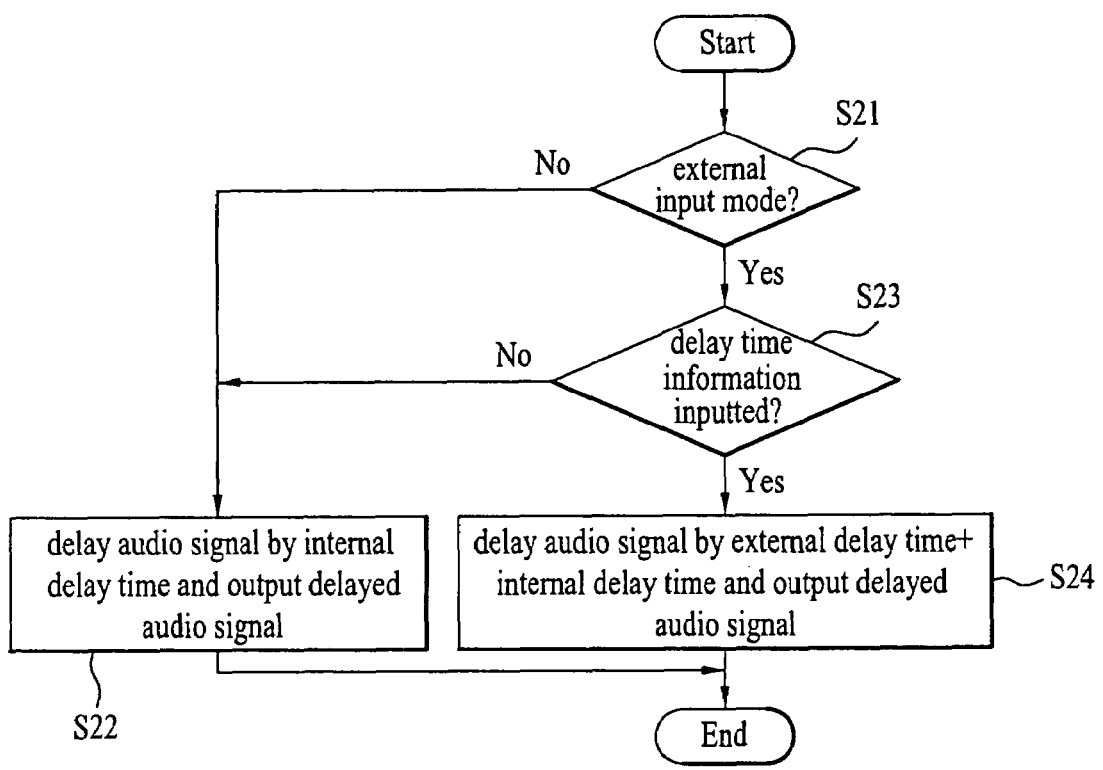
FIG. 4 is a flow chart illustrating a first embodiment of a method for controlling the video apparatus according to the present invention.

FIG. 4 is a flow chart illustrating a first embodiment of the method for controlling the video apparatus according to the present invention. First, the controller 17 determines whether the current mode of the video apparatus is an external input mode where the video apparatus receives a signal from an external device (for example, an STB) (S21).

If the current mode is determined not to be the external input mode at step S21, namely, if the video apparatus is receiving general broadcasting, the controller 17 reads internal delay time information stored in the memory 16 and determines the delay time of the delay 14 on the basis of the read internal delay time information. Thus, an audio signal from the delay 14 is synchronized with a video signal (S22). Since image reconstruction is carried out on a frame-by-frame basis due to the characteristics of the display unit 13, such as a plasma display panel (PDP) or liquid crystal display (LCD), the delay time of the delay 14 is set as a time corresponding to a frame unit, too. When the frame unit includes, for example, six frames, the delay time of the delay 14 is 0.12 sec because one frame corresponds to ¹⁄₅₀ sec (0.02 sec).

If the current mode is determined to be the external input mode at step S21, namely, if the video apparatus is receiving video and audio signals from the STB, the controller 17 determines whether external delay time information from the STB has been inputted (S23). If the external delay time information from the STB has been inputted, the controller 17 sums up an internal delay time stored in the memory 16 and an external delay time inputted from the STB and adjusts the delay time of the delay 14 to the summed-up delay time (S24).

On the other hand, in the case where no external delay time information from the STB is determined to have been inputted at step S23, the controller 17 adjusts the delay time of the delay 14 to the internal delay time stored in the memory 6. As a result, an audio signal from the video/audio processor 12 is delayed by the internal delay time and then outputted (S22). Where no external delay time information from the STB is inputted, a constituent element capable of providing the delay time information may not exist in the STB, or a video processing delay may not be present in the STB itself or may be so negligible as not to adversely affect the TV watching.

As an alternative, in the video apparatus according to the present invention, the user may manually adjust the delay time of the audio signal through the use of a separate key for the audio delay additionally provided in a remote controller or an existing key of the remote controller, or by using a menu for the audio delay provided in a user menu.

For example, for the remote controller, the audio signal is delayed by a predetermined reference time whenever the user pushes an 'AUDIO DELAY' key. In the case of the user menu, the user can solve a misalignment between the video signal and the audio signal by delaying the audio signal by a desired time through an 'AUDIO TIMING ADJUST' menu. In this case, if the user issues an audio delay command through the AUDIO TIMING ADJUST menu, the controller 17 controls the delay 14 such that the audio output is delayed by the corresponding unit time. Therefore, the synchronization between the video signal and the audio signal can be made only with the addition of a user menu and an associated program, without a need for separate hardware.

According to the first embodiment, the control method can simultaneously compensate for the video signal processing delay of the external device, which is an essential constituent element to the digital broadcasting reception, as well as the video signal processing delay of the video apparatus itself. In this control method, the video signal processing delay compensation by the user is also possible. Therefore, it is possible to perfectly solve a misalignment between picture and sound being finally outputted.

Second Embodiment

Figure 5:
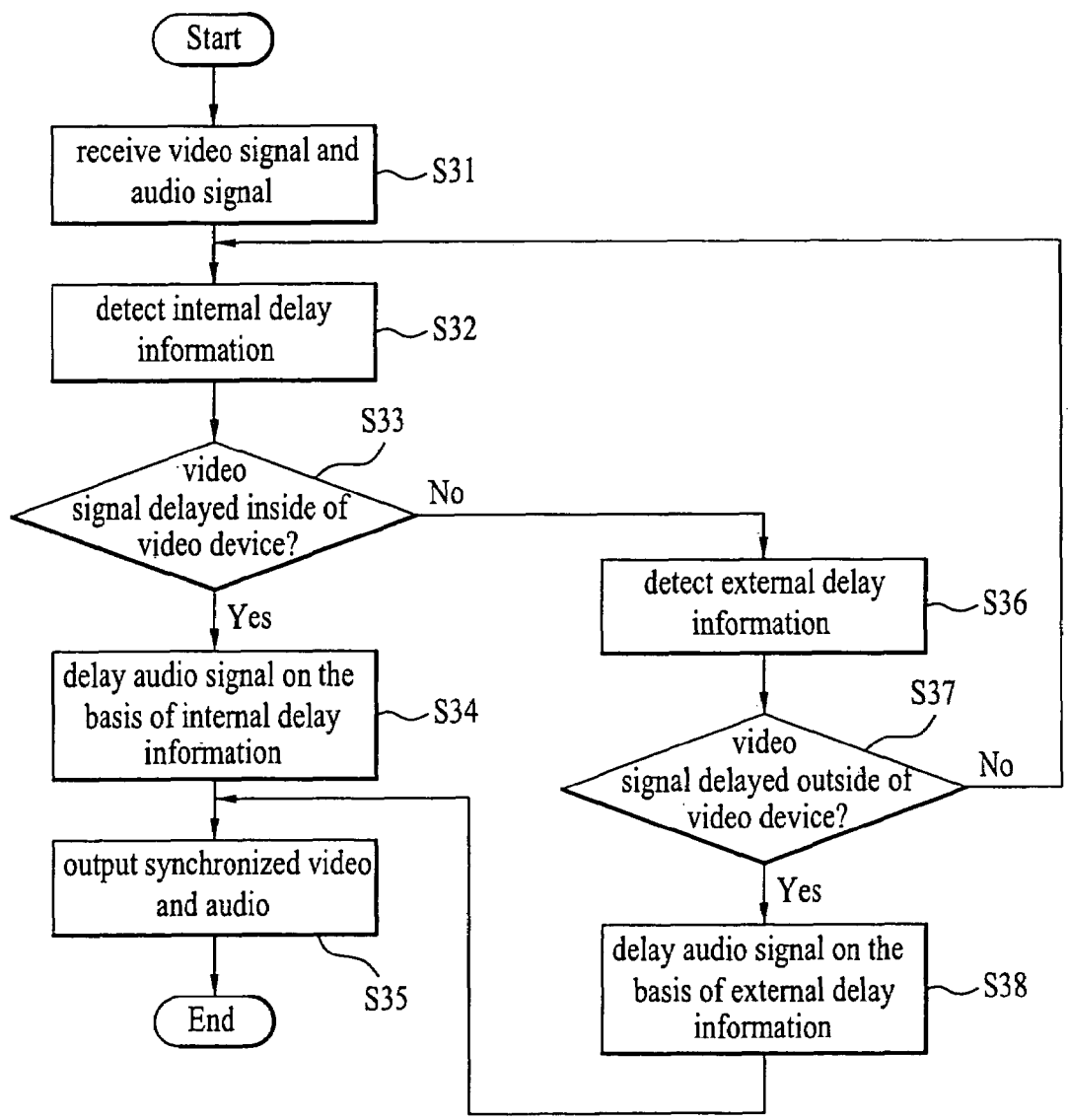
FIG. 5 is a flow chart illustrating a second embodiment of the method for controlling the video apparatus according to the present invention.

FIG. 5 is a flow chart illustrating a second embodiment of the method for controlling the video apparatus according to the present invention. The video apparatus can receive a general broadcast signal or a video signal and audio signal from an external device such as an STB, a cable receiver, digital versatile disc (DVD) player, a video cassette recorder (VCR), a personal computer (PC) or the like. The controller 17 determines whether the received video signal is delayed internal or external to the video apparatus and then delays the audio signal according to a result of the determination. The controller 17 can sequentially or simultaneously determine whether the video signal is delayed internal to the video apparatus and whether the video signal is delayed external to the video apparatus. In the second embodiment, an example is disclosed in which the controller 17 sequentially determines whether the video signal is internally delayed and whether the video signal is externally delayed.

First, if the video apparatus receives a video signal and an audio signal (S31), the controller 17 detects internal delay information of the video signal (S32). The internal delay information includes respective video processing times of video processing associated devices of the video apparatus, and the total of the video processing times.

In order to detect the internal delay information, the controller 17 can retrieve the internal delay information from the memory 16 or detect the internal delay information in real time. In order to detect the internal delay information in real time, the controller 17 detects data processing times of the internal devices of the video apparatus. That is, the controller 17 can detect the data processing time of each internal device on the basis of a time difference between a test clock sent to each device and a signal fed back in response to the test clock. Because the data processing time of the video apparatus is different depending on the volume of received data, it is effective to utilize the data processing time of each device detected in real time as the internal delay information.

After detecting the internal delay information, the controller 17 determines, on the basis of the detected internal delay information, whether the received video signal is delayed internal to the video apparatus (S33). Upon determining that the received video signal is delayed internal to the video apparatus, the controller 17 determines a delay time of the video signal from the internal delay information and then delays the audio signal inputted to the delay 14 by the delay time to synchronize the video signal and the audio signal with each other (S34). As a result, a time difference between the video signal to be displayed through the display unit 13 and the audio signal to be outputted through the speaker 15 is removed, so that the synchronized video signal and audio signal are displayed and outputted, respectively (S35).

If the received video signal is determined not to be delayed internal to the video apparatus (S33), the controller 17 receives information regarding a video source (e.g., air, a cable, a satellite, or a recording medium) and/or the external device. The external device information includes at least one of a manufacturer name, model name and identification (ID) of the external device. The controller 17 then detects external delay information of the video signal (S36). In order to detect the external delay information of the video signal, the controller 17 can detect external delay information stored in the memory 16 corresponding to the video source information and/or the external device information, or read external delay information from the external device in real time. The external delay information stored in the memory 16 includes a delay time based on the manufacturer and model of the external device.

After detecting the external delay information, the controller 17 determines, on the basis of the detected external delay information, whether the received video signal is delayed external to the video apparatus (S37). If it is determined that the received video signal is delayed external to the video apparatus, the controller 17 determines the delay time of the video signal from the external delay information and then delays the audio signal inputted to the delay 14 by the delay time to synchronize the video signal and the audio signal with each other (S38). Accordingly, a time difference between the video signal to be displayed through the display unit 13 and the audio signal to be outputted through the speaker 15 is removed, so that the synchronized video signal and audio signal are displayed and outputted, respectively (S35).

In addition, in the case where the received video signal is delayed internal and external to the video apparatus, the controller 17 delays the audio signal on the basis of the internal delay information and the external delay information to synchronize the video signal and the audio signal with each other.

As apparent from the above description, the video apparatus of the present invention can detect and remove a time difference between a video signal and an audio signal caused internal and external thereto. It is therefore possible to provide synchronized picture and sound to the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a video apparatus including at least one internal device for video processing, the method comprising:

receiving a video signal and an audio signal;

detecting an external delay time associated with the video signal according to external delay information corresponding to one of an external video source providing the audio and video signals to the video apparatus or an external device providing the audio and video signals to the video apparatus, wherein the external delay information is received from the external video source or external device and provides an indication of a period of video processing delay that occurs in the external video source or the external device;

detecting an internal delay time associated with the video signal;

summing the internal delay time and the external delay time; and synchronizing the received audio signal with the received video signal by delaying the received audio signal on the basis of the summed internal delay time and the external delay time, wherein the external video source or the external device includes a set-top box and the external delay information provides an indication of the period of video processing delay that occurs in the set-top box, and wherein the video apparatus includes a television coupled to the set-top box.

2. The method as set forth in claim 1, further comprising:
storing in a memory internal delay time information indicating an internal delay time corresponding to each internal device for video processing; and
reading the internal delay time information from the memory.

3. The method as set forth in claim 2, wherein the internal delay time information is read for each internal device for video processing.

4. The method as set forth in claim 2, wherein the internal delay time information is read for at least one internal device for video processing.

5. The method as set forth in claim 4, further comprising:
sending a test clock signal to at least one internal device for video processing; and
determining the internal delay time by detecting a time difference between the test clock signal and a feedback signal received from said at least one internal device for video processing in response to the sent test clock signal.

6. The method as set forth in claim 5, wherein the test clock is sent to an internal device for video processing where no corresponding internal delay time information is stored in the memory.

7. The method as set forth in claim 1, wherein the internal delay time is determined in real time by detecting a time difference between a test clock signal sent to each internal device for video processing and a feedback signal received from said each internal device for video processing in response to the sent test clock signal.

8. The method as set forth in claim 1, further comprising:
storing, in a memory, external delay time information indicating an external delay time associated with the video signal corresponding to each of a plurality of external devices for providing the audio and video signals to the video apparatus;
receiving the external delay information from the external device, the received external delay information including information indicating a specific external device of the plurality of external devices; and
reading from the memory the external delay time information corresponding to the specific external device.

9. The method as set forth in claim 8, wherein the external device information includes at least one of a manufacturer name, model name, or identification (ID) of the external device.

10. The method as set forth in claim 1, further comprising:
storing, in a memory, external delay time information indicating an external delay time associated with the video signal corresponding to each of a plurality of video sources for providing the audio and video signals to the video apparatus;
identifying a specific video source of the plurality of video sources; and
reading from the memory the external delay time information corresponding to the specific video source.

11. The method as set forth in claim 10, wherein the external delay information is received from the video source, the received external device information including information identifying the specific video source.

12. The method as set forth in claim 1, wherein further comprising: reading the external delay information in real time from the external device, the external delay information indicating an external delay time associated with the video signal corresponding to the external device.

13. The method as set forth in claim 1, wherein the external delay information is contained in the received video signal.

14. The method as set forth in claim 1, further comprising:
storing in a memory internal delay time information indicating an internal delay time corresponding to each internal device for video processing; and
determining in real time a delay time of each internal device for video processing by detecting a time difference between a test clock signal sent to each internal device for video processing and a feedback signal received from said each internal device for video processing in response to the sent test clock signal, wherein the summed delay times include at least one delay time corresponding to the stored internal delay time information and at least one delay time determined in real time.

15. The method of claim 1, wherein the external delay information corresponds to an external delay time associated with the received video signal only and wherein said summing includes summing the internal delay time and the external delay time through the set-top box associated with the video signal only, the audio signal and video signal synchronized by delaying only the audio signal based on the summed internal delay time and the external delay time.

16. The method of claim 1, further comprising:
displaying a menu allowing a user to adjust the delay time of the audio signal.

17. The method of claim 1, further comprising:
receiving a signal to adjust the delay time of the audio signal, said signal received from a remote control device in response to a button pressed by a user.

18. The method of claim 1, further comprising:
receiving the external delay information in the television simultaneously with the audio and video signal, the external delay information received through a Bluetooth connection.

19. The method of claim 1, further comprising:
receiving the external delay information in the television simultaneously with the audio and video signal, the external delay information received through a USB connection.

20. A video apparatus, comprising:
a video/audio processor for transforming a received video signal into a signal that can be displayed and a received audio signal into a signal that can be outputted, respectively, said video/audio processor including at least one internal device for video processing;
a controller for detecting an external delay time associated with the video signal according to external delay information corresponding to one of an external video source providing the audio and video signals to the video apparatus or an external device providing the audio and video signals to the video apparatus, for detecting an internal delay time associated with the video signal, and for summing the internal delay time and the external delay time; and
a delay for delaying the received audio signal by the summed internal delay time and external delay time, wherein the external delay information used as a basis for determining the external delay time provides an indication of a period of video processing delay that occurs in the external video source or the external device, wherein the external video source or the external device includes a set-top box and the external delay information provides an indication of the period of video processing delay that occurs in the set-top box, and wherein the video apparatus includes a television coupled to the set-top box.

21. The video apparatus as set forth in claim 20, further comprising: a memory for storing internal delay time information indicating an internal delay time corresponding to each internal device for video processing, wherein the controller is adapted to read the internal delay time information from said memory.

22. The video apparatus as set forth in claim 20, wherein the controller is adapted to send a test clock signal to each internal device for video processing and to determine in real time the internal delay time by detecting a time difference between the test clock signal and a feedback signal received from said each internal device for video processing in response to the sent test clock signal.

23. The video apparatus as set forth in claim 20, further comprising:
a memory for storing external delay time information indicating an external delay time associated with the video signal corresponding to each of a plurality of external devices for providing the audio and video signals to the video apparatus,
wherein the controller is adapted to receive the external delay information from the external device, the received external delay information including information indicating a specific external device of the plurality of external devices, and to read from said memory the external delay time information corresponding to the specific external device.

24. The video apparatus as set forth in claim 23, wherein the external device information includes at least one of a manufacturer name, model name, or ID of the external device.

25. The video apparatus as set forth in claim 20, further comprising: a memory for storing external delay time information indicating an external delay time associated with the video signal corresponding to each of a plurality of video sources for providing the audio and video signals to the video apparatus, wherein the controller is adapted to identify a specific video source of the plurality of video sources and to read from said memory an external delay time information corresponding to the specific video source.

26. The video apparatus as set forth in claim 20, wherein the controller is adapted to read the external delay information in real time from the external device, the external delay information indicating an external delay time associated with the video signal corresponding to the external device.

27. The video apparatus as set forth in claim 20, wherein the external delay information is contained in the received video signal.

28. The video apparatus of claim 20, wherein the external delay information corresponds to an external delay time associated with the received video signal only and wherein said summing includes summing the internal delay time and the external delay time through the set-top box associated with the video signal only, the audio signal and video signal synchronized by delaying only the audio signal based on the summed internal delay time and the external delay time.

29. A video apparatus, comprising:
a video/audio processor for respectively processing a received video signal and a received audio signal, said video/audio processor including at least one internal device for video processing;
a memory for storing internal delay time information indicating an internal delay time corresponding to each internal device for video processing and for storing external delay time information indicating an external delay time associated with the video signal corresponding to each of a plurality of external devices for providing the audio and video signals to the video apparatus and indicating an external delay time associated with the video signal corresponding to each of a plurality of video sources for providing the audio and video signals to the video apparatus;
a controller configured to receive external delay information corresponding to one of the plurality of video sources or external devices, the received external delay information indicative of one of a period of delay in a specific video source or a specific external device, said controller detecting an internal delay time associated with the video signal, by summing delay times for each of the at least one internal device for video processing, and detecting an external delay time associated with the video signal according to the received external delay information; and
a delay for delaying the received audio signal by the detected internal delay time and for further delaying the received audio signal by the external delay time according to the external delay time detection, wherein said one of the plurality of video sources or external devices includes a set-top box and the external delay information provides an indication of the period of video processing delay that occurs in the set-top box, and wherein the video apparatus includes a television coupled to the set-top box.

30. The video apparatus as set forth in claim 29, wherein said controller receives the external delay information from said one of the plurality of video sources or external devices.

31. The video apparatus as set forth in claim 29, wherein said controller receives the external delay information from said memory.

32. The video apparatus as set forth in claim 29, wherein said controller is configured to read from said memory the internal delay time information and the external delay time information and wherein said controller sets an audio signal delay time according to at least one of the read internal delay time information or the read external delay time information.

33. The video apparatus as set forth in claim 29, wherein said controller is configured to send a test clock signal to each internal device for video processing and to determine in real time the internal delay time by detecting a time difference between the test clock signal and a feedback signal received from said each internal device for video processing in response to the sent test clock signal.

34. The video apparatus as set forth in claim 33, wherein the summed delay times include at least one delay time corresponding to the stored internal delay time information and at least one delay time determined in real time.

35. The video apparatus of claim 29, wherein the external delay information corresponds to an external delay time associated with the received video signal only and wherein said summing includes summing the internal delay time and the external delay time through the set-top box associated with the video signal only, the audio signal and video signal synchronized by delaying only the audio signal based on the summed internal delay time and the external delay time.

* * * * *